(12) United States Patent
Wi et al.

(10) Patent No.: US 9,316,221 B2
(45) Date of Patent: Apr. 19, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Taehwan Wi, Bucheon-si (KR); Jin Young Hwang, Busan (KR); Se Hwan Jo, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 169 days.

(21) Appl. No.: 13/712,723

(22) Filed: Dec. 12, 2012

(65) Prior Publication Data

US 2014/0060676 A1 Mar. 6, 2014

(30) Foreign Application Priority Data

Sep. 3, 2012 (KR) ........................ 10-2012-0097302

(51) Int. Cl.
*F15B 11/00* (2006.01)
*F04B 49/00* (2006.01)
*F16H 61/00* (2006.01)
(Continued)

(52) U.S. Cl.
CPC .......... *F04B 49/002* (2013.01); *F16H 61/0021* (2013.01); *F16H 61/0025* (2013.01); *F16H 61/0031* (2013.01); *F16H 61/0206* (2013.01); *F04B 23/04* (2013.01); *F15B 2211/20592* (2013.01); *Y10T 137/85978* (2015.04)

(58) Field of Classification Search
CPC ..... F01M 1/02; F01M 1/16; F01M 2001/123; Y02T 10/76; F16H 57/0401; F16H 2047/025; F16H 204/045; F16H 57/0441; F04B 49/002; F04B 49/007; F04B 23/04

USPC ............. 417/278, 302, 307, 308, 364, 410.1, 417/440, 505; 123/1 A, 196 R, 196 S, 196 V, 123/196 W, 197.1, 198 P; 137/565.3, 137/565.33, 565.35
See application file for complete search history.

(56) References Cited

U.S. PATENT DOCUMENTS

| | | | | |
|---|---|---|---|---|
| 5,217,085 | A | * | 6/1993 | Barrie et al. ................ 184/104.1 |
| 5,875,865 | A | * | 3/1999 | Wakahara et al. ............ 180/248 |
| 6,923,091 | B2 | * | 8/2005 | Hori et al. ................... 74/606 R |

(Continued)

FOREIGN PATENT DOCUMENTS

| | | |
|---|---|---|
| JP | 3827926 B2 | 7/2006 |
| JP | 4754962 B2 | 6/2011 |

*Primary Examiner* — Devon Kramer
*Assistant Examiner* — Stephen Mick
(74) *Attorney, Agent, or Firm* — Morgan, Lewis & Bockius LLP

(57) ABSTRACT

A hydraulic pressure supply system may include a low-pressure hydraulic pump receiving the oil stored in the oil pan and generating the low hydraulic pressure, a low-pressure regulator valve controlling the low hydraulic pressure of the first low-pressure line, a reducing valve fluid-connected to the low-pressure regulator valve and supplying a hydraulic pressure to the low pressure portion, a high-pressure hydraulic pump increasing the low hydraulic pressure supplied from the low-pressure hydraulic pump, a switch valve disposed between the first low-pressure line and the high-pressure line, and selectively connecting the first low-pressure line and the high-pressure line, a high-pressure regulator valve controlling the increased hydraulic pressure supplied from the high-pressure hydraulic pump and the low hydraulic pressure selectively supplied from the low-pressure hydraulic pump through the switch valve, and supplying the stable high hydraulic pressure to the high pressure portion.

13 Claims, 2 Drawing Sheets

(51) Int. Cl.
*F16H 61/02* (2006.01)
*F04B 23/04* (2006.01)

(56) References Cited

U.S. PATENT DOCUMENTS

| | | | | |
|---|---|---|---|---|
| 6,941,922 B2 * | 9/2005 | Williams et al. | ......... | 123/196 R |
| 7,152,570 B2 * | 12/2006 | Lagerlof et al. | ......... | 123/196 R |
| 7,163,481 B2 | 1/2007 | Takagi et al. | | |
| 7,331,323 B2 * | 2/2008 | Hara | ......... | 123/196 A |
| 2006/0065217 A1 * | 3/2006 | Ikegawa | ......... | 123/41.42 |
| 2008/0308355 A1 * | 12/2008 | Kakinami et al. | ......... | 184/27.2 |
| 2009/0082153 A1 * | 3/2009 | Fujikawa et al. | ......... | 475/128 |

\* cited by examiner

HYDRAULIC PRESSURE SUPPLY SYSTEM OF AUTOMATIC TRANSMISSION

CROSS-REFERENCE TO RELATED APPLICATION

The present application claims priority to Korean Patent Application No. 10-2012-0097302 filed on Sep. 3, 2012, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which can improve safety and reliability as a consequence that the automatic transmission can be operated normally using hydraulic pressure of a low-pressure hydraulic pump when a high-pressure hydraulic pump is stopped.

2. Description of Related Art

Recently, vehicle makers direct all their strength to improve fuel economy due to worldwide high oil prices and strengthen of exhaust gas regulations.

Improvement of fuel economy may be achieved by improving power delivery efficiency in an automatic transmission, and improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Since power consumption for driving the hydraulic pumps can be minimized, fuel economy may be enhanced. In addition, since a load applied to the hydraulic pumps is reduced, noise and vibration may be reduced and durability may be improved.

Since hydraulic pressure generated by the low-pressure hydraulic pump is supplied to the high-pressure hydraulic pump and the high hydraulic pressure is generated by the high-pressure hydraulic pump according to a conventional hydraulic pressure supply system, the hydraulic pressure supplied to the high pressure portion is insufficient and vehicle cannot drive if the high-pressure hydraulic pump is out of order.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of improving safety and reliability when a high-pressure hydraulic pump is out of order or is stopped as a consequence of normally operating the hydraulic pressure supply system only by using hydraulic pressure of a low-pressure hydraulic pump.

In an aspect of the present invention, a hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion, may include a low-pressure hydraulic pump receiving the oil stored in the oil pan through a first input line that fluid-connects the oil pan and the low-pressure hydraulic pump, generating the low hydraulic pressure, and discharging the low hydraulic pressure to a first low-pressure line, a low-pressure regulator valve fluid-connected to the first low-pressure line and controlling the low hydraulic pressure of the first law-pressure line to be stable low hydraulic pressure, a reducing valve fluid-connected to the low-pressure regulator valve and receiving the stable low hydraulic pressure from the low-pressure regulator valve through a second low-pressure line, lowering the stable low hydraulic pressure, and supplying a hydraulic pressure to the low pressure portion through a third low-pressure line, a high-pressure hydraulic pump fluid-connected to the first low pressure line and increasing the low hydraulic pressure supplied from the low-pressure hydraulic pump through the first low-pressure line, and discharging the high hydraulic pressure to a high-pressure line fluid-connected to the high-pressure hydraulic pump, a switch valve disposed between the first low-pressure line and the high-pressure line, and selectively connecting the first low-pressure line and the high-pressure line, a high-pressure regulator valve fluid-connected to the high-pressure line and controlling the increased hydraulic pressure supplied from the high-pressure hydraulic pump through the high-pressure line and the low hydraulic pressure selectively supplied from the low-pressure hydraulic pump through the switch valve to be a stable high hydraulic pressure, and supplying the stable high hydraulic pressure to the high pressure portion, and a second input line connecting the oil pan to the first low-pressure line.

The low-pressure hydraulic pump is a mechanical hydraulic pump driven by an engine, and the high-pressure hydraulic pump is an electric hydraulic pump driven by an electric motor.

The low-pressure regulator valve is controlled by a control pressure of a first solenoid valve being an on/off solenoid valve.

The reducing valve is controlled by a control pressure of a first solenoid valve being an on/off solenoid valve.

The switch valve is controlled by a control pressure of a first solenoid valve being an on/off solenoid valve.

The low-pressure regulator valve is connected to the first low-pressure line and is connected to the first input line through a first recirculation line so as to recirculate a portion of the low hydraulic pressure supplied through the first low-pressure line to the first input line through the first recirculation line and to control the low hydraulic pressure to be stable.

The low-pressure regulator valve is controlled by a control pressure of a first solenoid valve, an elastic force of an elastic member, and the low hydraulic pressure of the first low-pressure line counteracting the control pressure of the first solenoid valve.

The reducing valve is connected to the second low-pressure line and is connected to the first input line through a second recirculation line so as to recirculate a portion of the stable low hydraulic pressure supplied through the second low-pressure line to the first input line through the second recirculation line and to further lower the stable low hydraulic pressure.

The reducing valve is controlled by a control pressure of a first solenoid valve, an elastic force of an elastic member, and the hydraulic pressure of the third low-pressure line counteracting the control pressure of the first solenoid valve.

The high-pressure regulator valve is selectively connected to the first low-pressure line through the switch valve and is directly connected to the high-pressure line so as to supply a portion of hydraulic pressure supplied from the first low-pressure line or the high-pressure line to a supply line and to control the high hydraulic pressure to be stable.

The supply line is connected to the third low-pressure line.

The high-pressure regulator valve is controlled by a control pressure of a second solenoid valve, an elastic force of an elastic member, and the low hydraulic pressure of the first low-pressure line or the high-pressure line counteracting the control pressure of the second solenoid valve.

The second solenoid valve is a proportional control solenoid valve.

The switch valve is controlled by a control pressure of a first solenoid valve so as to disconnect the first low-pressure line from the high-pressure line when the first solenoid valve is switched off and to connect the first low-pressure line to the high-pressure line when the first solenoid valve is switched on.

A check valve for preventing back flow is mounted on the second input line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
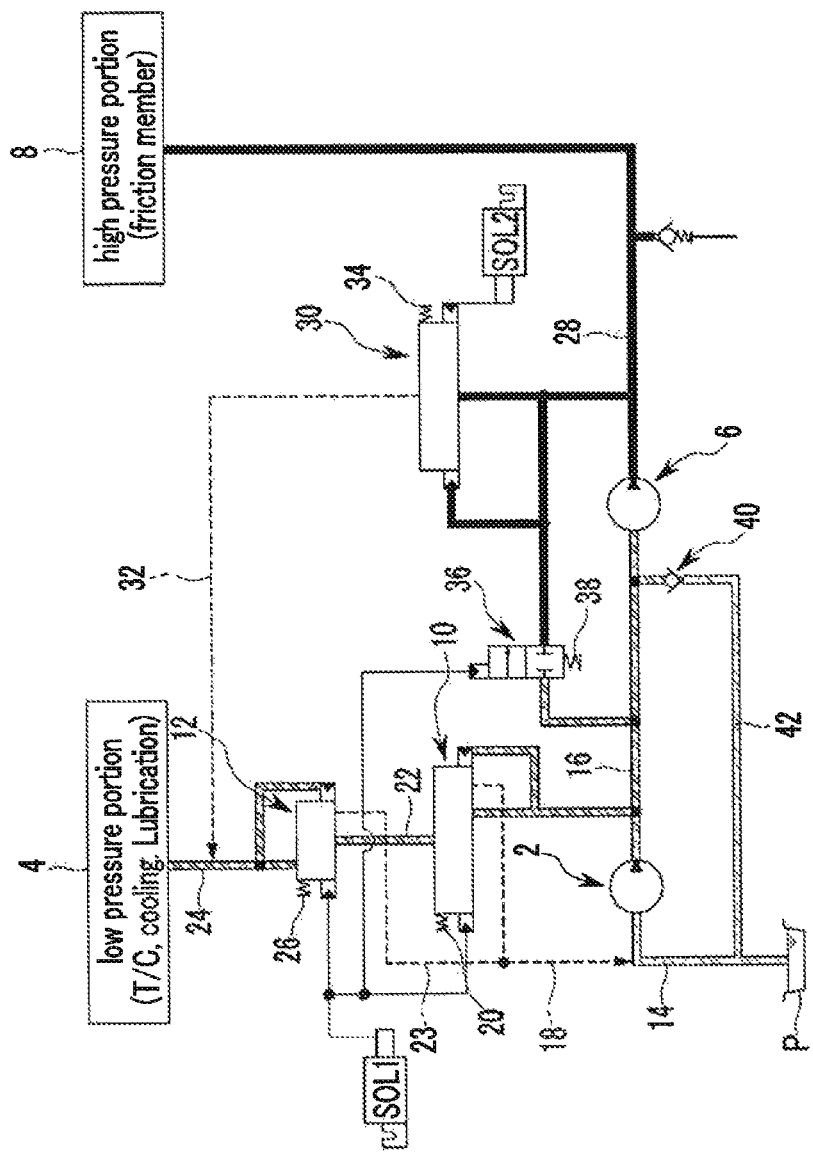
FIG. 1 is a schematic diagram of a hydraulic pressure supply system according to an exemplary embodiment of the present invention when a low-pressure hydraulic pump and a high-pressure hydraulic pump are operated normally.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system according to an exemplary embodiment of the present invention when a low-pressure hydraulic pump and a high-pressure hydraulic pump are operated normally.

Referring to FIG. 1, a hydraulic pressure supply system according to an exemplary embodiment of the present invention is adapted to supply low hydraulic pressure generated by a low-pressure hydraulic pump 2 to a low pressure portion 4 such as a torque converter (T/C), a cooling portion, a lubrication portion and to supply high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure is generated by the low-pressure hydraulic pump 2 and is supplied to the low pressure portion 4 through a low-pressure regulator valve 10 and a reducing valve 12.

The low-pressure hydraulic pump 2, as is well known to a person of an ordinary skill in the art, is a mechanical pump driven by torque of an engine.

The low-pressure hydraulic pump 2 is connected to an oil pan P through a first input line 14, and the low hydraulic pressure generated by the low-pressure hydraulic pump 2 is discharged to a first low-pressure line 16.

The low-pressure regulator valve 10 is connected to the low-pressure hydraulic pump 2 through the first low-pressure line 16 and is connected to the first input line 14 through a first recirculation line 18. Therefore, the low-pressure regulator valve 10 recirculates a portion of the low hydraulic pressure supplied from the first low-pressure line 16 to the first input line 14 through the first recirculation line 18 so as to control the hydraulic, pressure to be stable low hydraulic pressure.

For this purpose, the low-pressure regulator valve 10 may be a conventional spool valve. In addition, the low-pressure regulator valve 10 is controlled by control pressure of a first solenoid valve SOL1 that can be on/off-controlled, elastic force of an elastic member 20, and the hydraulic pressure of the first low-pressure line 16 counteracting the control pressure of the first solenoid valve SOL1. The elastic force of the elastic member 20 may be set according to the hydraulic pressure demanded by the first low-pressure line 16.

The reducing valve 12 further lowers the low hydraulic pressure supplied from the low-pressure regulator valve 10 through a second low-pressure line 22 and then supplies the low hydraulic pressure to the low pressure portion 4 through a third low-pressure line 24.

That is, the reducing valve 12 is connected to the second low-pressure line 22 and is connected to the first input line 14 through a second recirculation line 23. Therefore, the reducing valve 12 recirculates a portion of the low hydraulic pressure supplied from the second low-pressure line 22 to the first input line 14 through the second recirculation line 23 so as to further lower the low hydraulic pressure.

For this purpose, the reducing valve 12 may be a conventional spool valve. In addition, the reducing valve 12 is controlled by the control pressure of the first solenoid valve SOL1 that can be on/off-controlled, elastic force of an elastic member 26, and the hydraulic pressure of the third low-pressure line 24 counteracting the control pressure of the first solenoid valve SOL1. The elastic force of the elastic member 26 may be set according to the hydraulic pressure demanded by the low pressure portion 4.

The high-pressure hydraulic pump 6 may be an electric pump driven by an electric motor.

The high-pressure hydraulic pump 6 increases the low hydraulic pressure supplied through the first low-pressure line 16 to the high hydraulic pressure, and then discharges the high hydraulic pressure to a high-pressure line 28. In addition, the hydraulic pressure discharged from the high-pressure hydraulic pump 6 to the high-pressure line 28 is controlled to be stable high hydraulic pressure by a high-pressure regulator valve 30, and is then supplied to the high pressure portion 8.

The high-pressure regulator valve 30 is connected to the high-pressure line 28 and is connected to the third low-pressure line 24 through a supply line 32. Therefore, the high-pressure regulator valve 30 supplies a portion of the hydraulic pressure supplied through the high-pressure line 28 to the third low-pressure line 23 through the supply line 32 so as to control the hydraulic pressure.

For this purpose, the high-pressure regulator valve 30 may be a conventional spool valve. In addition, the high-pressure regulator valve 30 is controlled by control pressure of a second solenoid valve SOL2 performing proportional control, elastic force of an elastic member 34, and the hydraulic pressure of the first low-pressure line 16 or the high-pressure line 28 counteracting the control pressure of the second solenoid valve SOL2. The elastic force of the elastic member 34 may be set according to the hydraulic pressure demanded by the high-pressure line 28.

The supply line 32 is connected to the third low-pressure line 24 so as to supply the hydraulic pressure to the low pressure portion 4 when only the high-pressure hydraulic pump 6 is operated.

In addition, a switch valve 36 is disposed between the first low-pressure line 16 and the high-pressure line 28.

The switch valve 36 may be a spool valve, and is controlled by the first solenoid valve SOL1 that is on/off controlled so as to selectively supply the hydraulic pressure of the first low-pressure line 16 to the high-pressure line 28.

For this purpose, the control pressure of the first solenoid valve SOL1 is supplied to a side of the switch valve 36 and an elastic member 38 is disposed at the other side of the switch valve 36. Therefore, the first low-pressure line 16 and the high-pressure line 28 are not connected if the first solenoid valve SOL1 is switched off, and the first low-pressure line 16 and the high-pressure line 28 are connected if the first solenoid valve SOL1 is switched on.

In addition, the high-pressure hydraulic pump 6 is connected to the oil pan P through a second input line 42. A check valve 40 for preventing back flow is disposed on the second input line 40. Therefore, the high-pressure hydraulic pump 6 directly receives the oil from the oil pan P so as to generate the high hydraulic pressure when the hydraulic pressure is not supplied from the low-pressure hydraulic pump 2.

When the low-pressure hydraulic pump 2 and the high-pressure hydraulic pump 6 are operated normally, the hydraulic pressure supply system according to an exemplary embodiment of the present invention supplies the low hydraulic pressure generated by the low-pressure hydraulic pump 2 to the low pressure portion 4 and supplies the high hydraulic pressure generated by the high-pressure hydraulic pump 6 to the high pressure portion 8, as shown in FIG. 1.

That is, when two hydraulic pumps 2 and 6 are operated normally, the first solenoid valve SOL1 is switched off and the second solenoid valve SOL2 is controlled according to the demanded high hydraulic pressure.

If the first solenoid valve SOL1 is switched off, the low-pressure regulator valve 10 and the reducing valve 12 are controlled respectively by the hydraulic pressures generated at the first low-pressure line 16 and the third low-pressure line 24 and the elastic forces of the elastic members 20 and 26, and control the low hydraulic pressure.

In addition, if the first solenoid valve SOL1 is switched off, the switch valve 36 disconnects the first low-pressure line 16 from the high-pressure line 28.

Figure 2:
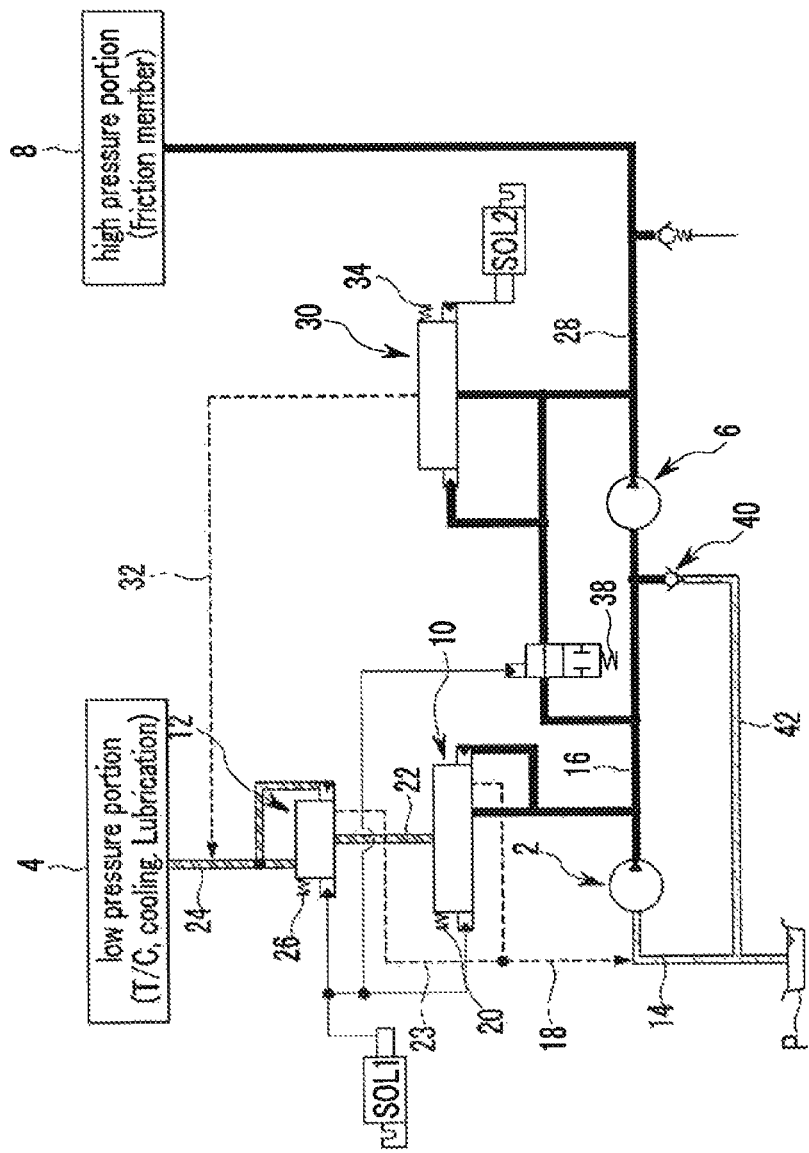
FIG. 2 is a schematic diagram of a hydraulic pressure supply system according to an exemplary embodiment of the present invention when a high-pressure hydraulic pump is operated abnormally.

FIG. 2 is a schematic diagram of a hydraulic pressure supply system according to an exemplary embodiment of the present invention when a high-pressure hydraulic pump is operated abnormally.

That is, oil flow when the high-pressure hydraulic pump 6 is not operated due to failure is illustrated in FIG. 2. At this time, the first solenoid valve SOL1 is switched on.

At this time, the low-pressure hydraulic pump 2 increases discharging amount so as to generate the high hydraulic pressure, and the control pressure of the first solenoid valve SOL1 is supplied to the low-pressure regulator valve 10, the reducing valve 12, and the switch valve 36. Therefore, the high hydraulic pressure is generated at the first low-pressure line 16 and is also applied to the low-pressure regulator valve 10.

The high hydraulic pressure generated at the first low-pressure line 16 is supplied to the high-pressure line 28 through the switch valve 36. In addition, the high-pressure regulator valve 30 controls the hydraulic pressure supplied to the high-pressure line 28 and supplies the hydraulic pressure to the high pressure portion 8. Therefore, the high pressure portion 8 can be operated smoothly.

Since the hydraulic pressure supply system is operated normally using the low-pressure hydraulic pump 2 when the high-pressure hydraulic pump 6 is not operated, safety and reliability of the hydraulic pressure supply system having two hydraulic pumps 2 and 6 may be improved.

Particularly, when the vehicle provided with the ISG system is stopped temporarily, the high hydraulic pressure may be supplied to the high pressure portion 8 in a state of engine stop. At this time, the high-pressure hydraulic pump 6 is operated so as to pump the oil in the oil pan P through the second input line 42 and generate the high hydraulic pressure. Therefore, the preparatory hydraulic pressure can be supplied to the high pressure portion 8.

That is, although the engine is stopped and the low-pressure hydraulic pump 2 is not operated, the high hydraulic pressure can be supplied to the high pressure portion 8 by operation of the high-pressure hydraulic pump 6.

According to an exemplary embodiment of the present invention, the low-pressure hydraulic pump 2 generates the low hydraulic pressure and the high-pressure hydraulic pump 6 generates the high hydraulic pressure by increasing the hydraulic pressure supplied from the low-pressure hydraulic pump 2. Therefore, power loss of the hydraulic pumps may be minimized, durability may be improved, noise and vibration of the hydraulic pumps may be reduced.

In addition, the hydraulic pressure supply system can be operated normally using the low-pressure hydraulic pump 2 when the high-pressure hydraulic pump 6 is not operated. Therefore, stability and reliability may be enhanced.

In addition, since the high-pressure hydraulic pump 6 can generate the high hydraulic pressure independently, the system may be applied to the vehicle having the ISG system.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion, the hydraulic pressure supply system comprising:
   a low-pressure hydraulic pump receiving the oil stored in the oil pan through a first input line that fluid-connects the oil pan and the low-pressure hydraulic pump, generating the low hydraulic pressure, and discharging the low hydraulic pressure to a first low-pressure line;
   a low-pressure regulator valve fluid-connected to the first low-pressure line and controlling the low hydraulic pressure of the first low-pressure line to be stable low hydraulic pressure;
   a reducing valve fluid-connected to the low-pressure regulator valve and receiving the stable low hydraulic pressure from the low-pressure regulator valve through a second low-pressure line, lowering the stable low hydraulic pressure, and supplying a hydraulic pressure to the low pressure portion through a third low-pressure line;
   a high-pressure hydraulic pump fluid-connected to the first low pressure line and increasing the low hydraulic pressure supplied from the low-pressure hydraulic pump through the first low-pressure line, and discharging the high hydraulic pressure to a high-pressure line fluid-connected to the high-pressure hydraulic pump;
   a switch valve disposed between the first low-pressure line and the high-pressure line, and selectively connecting the first low-pressure line and the high-pressure line;
   a high-pressure regulator valve fluid-connected to the high-pressure line and controlling the increased hydraulic pressure supplied from the high-pressure hydraulic pump through the high-pressure line and the low hydraulic pressure selectively supplied from the low-pressure hydraulic pump through the switch valve to be a stable high hydraulic pressure, and supplying the stable high hydraulic pressure to the high pressure portion; and
   a second input line connecting the oil pan to the first low-pressure line;
   wherein the high-pressure regulator valve is selectively connected to the first low-pressure line through the switch valve and is directly connected to the high-pressure line so as to supply a portion of hydraulic pressure supplied from the first low-pressure line or the high-pressure line to a supply line and to control the high hydraulic pressure to be stable, and
   wherein the supply line is connected to the third low-pressure line.

2. The hydraulic pressure supply system of claim 1, wherein the low-pressure hydraulic pump is a mechanical hydraulic pump driven by an engine, and the high-pressure hydraulic pump is an electric hydraulic pump driven by an electric motor.

3. The hydraulic pressure supply system of claim 1, wherein the low-pressure regulator valve is controlled by a control pressure of a first solenoid valve being an on/off solenoid valve.

4. The hydraulic pressure supply system of claim 1, wherein the reducing valve is controlled by a control pressure of a first solenoid valve being an on/off solenoid valve.

5. The hydraulic pressure supply system of claim 1, wherein the switch valve is controlled by a control pressure of a first solenoid valve being an on/off solenoid valve.

6. The hydraulic pressure supply system of claim 1, wherein the low-pressure regulator valve is connected to the first low-pressure line and is connected to the first input line through a first recirculation line so as to recirculate a portion of the low hydraulic pressure supplied through the first low-pressure line to the first input line through the first recirculation line and to control the low hydraulic pressure to be stable.

7. The hydraulic pressure supply system of claim 1, wherein the low-pressure regulator valve is controlled by a control pressure of a first solenoid valve, an elastic force of an elastic member, and a portion of the low hydraulic pressure of the first low-pressure line wherein the portion of the low hydraulic pressure of the first low-pressure line counteracts the control pressure of the first solenoid valve.

8. The hydraulic pressure supply system of claim 6, wherein the reducing valve is connected to the second low-pressure line and is connected to the first input line through a second recirculation line so as to recirculate a portion of the stable low hydraulic pressure supplied through the second low-pressure line to the first input line through the second recirculation line and to further lower the stable low hydraulic pressure.

9. The hydraulic pressure supply system of claim 1, wherein the reducing valve is controlled by a control pressure of a first solenoid valve, an elastic force of an elastic member, and a portion of the hydraulic pressure of the third low-pressure line wherein the portion of the hydraulic pressure of the third low-pressure line counteracts the control pressure of the first solenoid valve.

10. The hydraulic pressure supply system of claim 3, wherein the high-pressure regulator valve is controlled by a control pressure of a second solenoid valve, an elastic force of an elastic member, and the low hydraulic pressure of the first low-pressure line or the high-pressure line counteracting the control pressure of the second solenoid valve.

11. The hydraulic pressure supply system of claim 10, wherein the second solenoid valve is a proportional control solenoid valve.

12. The hydraulic pressure supply system of claim 1, wherein the switch valve is controlled by a control pressure of a first solenoid valve so as to disconnect the first low-pressure line from the high-pressure line when the first solenoid valve is switched off and to connect the first low-pressure line to the high-pressure line when the first solenoid valve is switched on.

13. The hydraulic pressure supply system of claim 1, wherein a check valve for preventing back flow is mounted on the second input line.

* * * * *